United States Patent
Smith

(10) Patent No.: US 6,694,311 B1
(45) Date of Patent: Feb. 17, 2004

(54) METHOD AND APPARATUS FOR FAST QUERY APPROXIMATION USING ADAPTIVE QUERY VECTOR PROJECTION

(75) Inventor: John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/489,773

(22) Filed: Jan. 24, 2000

Related U.S. Application Data

(60) Provisional application No. 60/117,006, filed on Jan. 25, 1999.

(51) Int. Cl.[7] .............................................. G06F 17/30
(52) U.S. Cl. .................. 707/4; 707/3; 707/10; 707/104.1; 706/25; 345/431; 382/165; 382/172; 382/174; 382/190
(58) Field of Search ...................... 707/4, 10, 104.1; 706/25; 345/431; 382/165, 172, 190, 174

(56) References Cited

U.S. PATENT DOCUMENTS

| | | | | |
|---|---|---|---|---|
| 5,276,771 A | * | 1/1994 | Manukian et al. ............ 706/25 |
| 5,913,205 A | * | 6/1999 | Jain et al. ...................... 707/2 |
| 6,014,671 A | | 1/2000 | Castelli et al. |
| 6,084,595 A | * | 7/2000 | Bach et al. ................... 345/431 |
| 6,192,150 B1 | * | 2/2001 | Leow et al. ................. 382/190 |
| 6,334,129 B1 | * | 12/2001 | Kiyoki et al. .................. 707/5 |

OTHER PUBLICATIONS

U.S. patent application Ser. No. 09/079,662, Castelli et al., filed May 14, 1998, "Interactive Representation and Retrieval of Multi–Dimensional Data Using View Elements."

* cited by examiner

*Primary Examiner*—Kim Vu
*Assistant Examiner*—Hung Pham
(74) *Attorney, Agent, or Firm*—Thu Ann Dang; Ryan, Mason & Lewis, LLP

(57) ABSTRACT

Methods and apparatus are provided for querying by similarity in large collections of high-dimensional vectors by adaptively projecting each query vector into a library of projection elements; by selecting the set of elements that minimizes the work for processing each query; and by adaptively selecting the set of elements in order to exercise the tradeoff between query precision and query response time. The present invention provides for the storage of the projected vector as a meta-data description of data to enable content-based querying of the data.

20 Claims, 7 Drawing Sheets

METHOD AND APPARATUS FOR FAST QUERY APPROXIMATION USING ADAPTIVE QUERY VECTOR PROJECTION

CROSS REFERENCE TO RELATED APPLICATIONS

The present application claims priority to the U.S. provisional patent application identified by Ser. No. 60/117,006 filed on Jan. 25, 1999, the disclosure of which is incorporated herein by reference, and the present application is related to the U.S. Pat. No. 6,014,671, entitled: "Interactive Retrieval and Caching of Multi-dimensional Data Using View Elements," issued on Jan. 11, 2000 in the name of Castelli et al.; and to the U.S. patent application identified by Ser. No. 09/079,662 entitled: "Interactive Representation and Retrieval of Multi-dimensional Data Using View Elements," filed on May 15, 1998 in the name of Castelli et al., the disclosures of which are incorporated herein by reference.

FIELD OF THE INVENTION

The present invention generally relates to information query methodologies and, more particularly, to methods and apparatus for performing fast query approximation using adaptive query vector projection.

BACKGROUND OF THE INVENTION

The power and appeal of today's database systems and digital libraries is their support for complex material such as images, video, audio and time-series data. Multimedia databases are gaining new functionalities that allow searching by the audio, visual and textual features of the content. For example, content-based image query methods use feature vectors to search for images where the feature vector proximity determines the image similarity. In general, the content-based query methods do not scale well to large databases since the high-dimensionality of the vectors makes them incompatible with traditional multi-dimensional indexing methods.

There are many approaches for indexing multi-dimensional data in databases. Multi-dimensional index structures such as R-trees, SS-trees and SR-trees are well suited for vectors of a few dimensions but become extremely inefficient for more than ten dimensions. Since content-based query methods often utilize vectors with greater than 256 dimensions, other approaches such as dimensionality reduction and pre-;filtering are needed.

Dimensionality reduction techniques such as singular value decomposition (SVD) and the discrete cosine transform (DCT) can be used to compact high-dimensional vectors into a few dimensions. SVD generates the optimal linear transformation that compacts the most energy into the fewest dimensions. However, SVD needs to be trained and problems arise for dynamic databases. Furthermore, there is no guarantee that the query vectors will be compacted well by the SVD transform derived from training on the target data. SVD provides no worst case performance bound. Certain pathological queries that do not match the training data can be poorly represented using the SVD approach. On the other hand, the DCT is independent of the data and needs no training. However, since it provides only a fixed set of basis functions, DCT may not work well for all data sets. Other transformations such as the discrete Fourier transform (DFT) and Haar transform provide different fixed sets of basis functions, but generally have the same limitations as DCT.

While dimensionality reduction techniques can speed up querying by using fewer dimensions, they also allow the data to be indexed by multi-dimensional index structures. The integration of dimensionality reduction and multi-dimensional indexing has been investigated in several algorithms and system, such as FastMap, RCSVD, SVDD, and QBIC. The FastMap algorithm compacts time-series data into two-dimensional streams that are indexed by the R-tree. RCSVD integrates recursive clustering with SVD in order to better compact multi-dimensional vectors. RCSVD indexes the compacted vectors using an R-tree.

The IBM (of Armonk, N.Y.) Query by Image Content (QBIC) system uses dimensionality reduction in a staged query system in order to index color images using high-dimensional color histograms. In the first stage, the images are indexed using only three dimensions, which are derived from the mean image color in the three color channels. This stage pre-filters the next stage, in which the actual histogram distances are computed for the smaller set of surviving items.

SUMMARY OF THE INVENTION

The present invention provides a new query-centric approach that addresses the shortcomings of the existing dimensionality reduction methods. Key features of the methodology of the invention are that the system stores a redundant projection library of transformation building blocks for the target vectors. Then, the system rapidly searches for the optimal transformation at query-time. The projection library provides an extremely large number of different ways for compacting the vectors. For example, for 128-dimensional vectors, the projection library of 448 projection elements provides $O(10_{16})$ unique complete transformations and $O(10_{33})$ unique incomplete projections. The invention involves the use of a fast strategy for searching the projection library at query-time to select the best set of projection elements for computing the query.

Rather than training on the target data to select one particular transformation, such as in SVD, the present invention selects the best transformation, on-the-fly, by analyzing the query vector. In short, the method selects the elements that correspond to the most significant space and frequency dimensions of each specific query vector. This eliminates the potential for mismatch between the query vector and the transformation, as happens with SVD, DCT, DFT, and Haar transform. This results in greater compaction of the query vector, improved efficiency in processing each query, and speed-up in query response time.

In order to achieve the query efficiency, the system stores redundant data in the projection library. This may be done by compressing and efficiently storing the projection elements. The approach has many advantages. First, for example, the projections of the query vector can be either complete or incomplete. If complete, the system computes the query with perfect precision. If incomplete, the system approximates the query. Since the system can select incomplete projections to compact the energy of the query vectors into any number of dimensions, the method allows a flexible query-time tradeoff between query precision and query response time.

The present invention is suitable for scalable content-based query systems since it works by adaptively selecting and utilizing the most significant space and frequency dimensions of each specific query vector in order to efficiently process each query.

More specifically, the present invention is directed towards apparatus and methods for querying by similarity in databases of high-dimensional vectors. The invention comprises projecting the query vector into a redundant library and selecting the best set of projection elements for processing the query. The invention also comprises a mathematical decomposition of the vectors into the library that guarantees that any complete set of projection elements represents the vectors perfectly and can be used to compute the vector proximities with perfect precision. Furthermore, the invention also provides for small and non-redundant sets of projection elements to form approximations of the vectors and the vector proximities. The invention provides for selecting non-redundant sets of projection elements to efficiently compute the similarity queries while admitting small losses in precision.

The invention provides for determining the query efficiency at query time by selecting the transformation of the query vector using a large number of alternative projections, on the following bases: (i) efficiency—the size of the selected element set, or equivalently, the dimensionality of the transformed query vector; (ii) query vector precision—the approximation of the reconstructed projected query vector to the actual query vector; and (iii) query results precision—the bound on the error in the computed similarity between the query and the target vectors.

The invention provides a framework for greatly improving query efficiency and allowing the user to tradeoff query-response time and query-precision.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary information query system. It should be understood, however, that the invention is not limited to use with any particular information query system. The invention is instead more generally applicable to any information query system in which it is desirable to substantially improve query efficiency and allow a user to tradeoff query-response time and query-precision.

Figure 1:
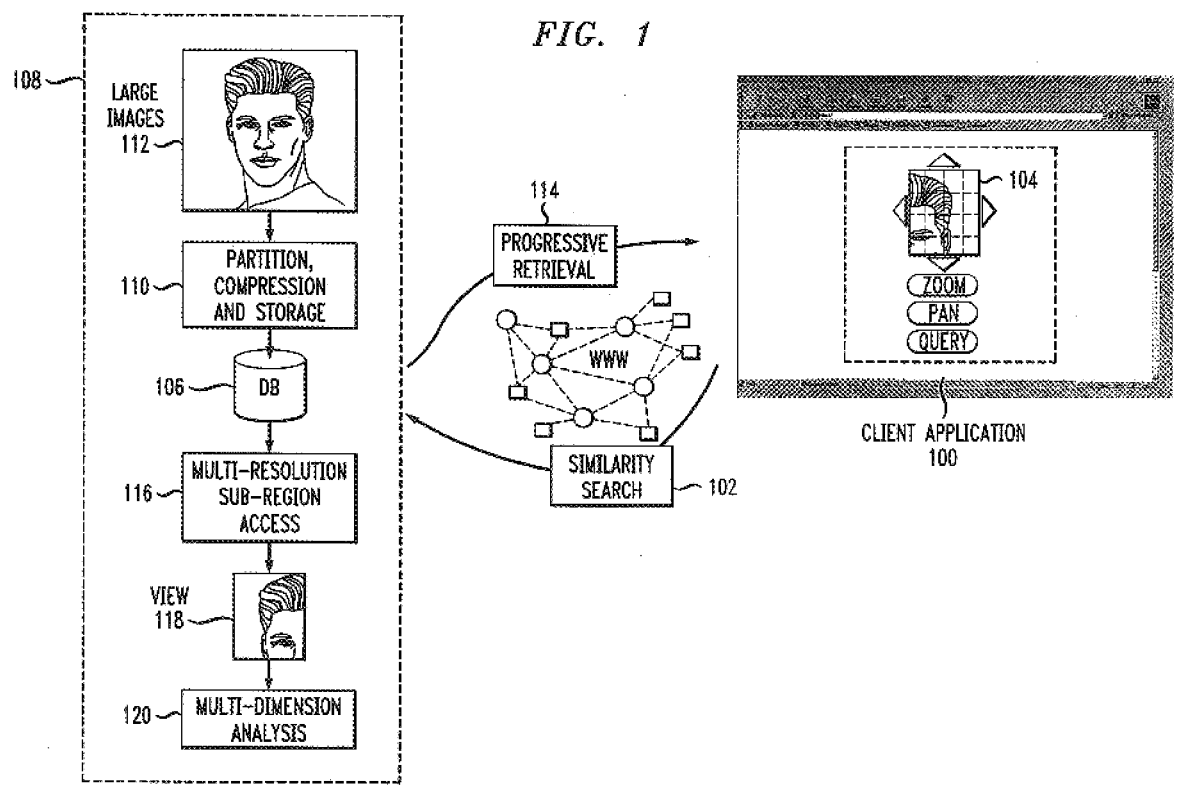
FIG. 1 is a block diagram illustrating a networked information system suitable for implementing high-dimensional vector querying according to the present invention.

FIG. 1 depicts an example of a networked client-server information system which is suitable for implementing high-dimensional vector querying according to the present invention. As shown, a client application 100 issues a similarity search request,.i.e., query 102, based on the content or features of an image 104 viewed in accordance with the application 100. The query can be represented as a multi-dimensional vector or histogram. A database system 106, resident at a server 108, compares the query vector to target vectors in the database. It is to be understood that the target vectors may have been previously generated, processed and stored in the database system 106 via a partition, compression and storage module 110, also resident at the server 108. For example, large images 112 may be partitioned, compressed and stored in the database system 106 in accordance with the module 110. The database system 106 retrieves the items with the target vectors that are most similar to the query vector. The results 114 of the retrieval operation are returned to the client application 100. In accordance with the present invention, as will be explained in detail below, the database system 106 can represent the target vectors using a redundant projection library that advantageously provides flexibility and efficiency in computing the query results. Furthermore, the feature descriptor for the image can be represented using a redundant projection vector that also advantageously provides flexibility and efficiency in computing the query results.

FIG. 1 also shows a multi-resolution sub-region access system 116, an image view 118 and a multi-dimensional analysis system 120. While these elements are not necessary for implementing the invention, they may be part of the networked client-server information system. The multi-resolution sub-region access system 116 retrieves views of the large images from the database 106. The views 118 are optionally passed to the multi-dimensional analysis system 120 for feature extraction or further analysis of the image view data.

It is to be appreciated that an example of such a networked client-server information system as illustrated in FIG. 1 may include an arrangement wherein a user at a personal computer or workstation (client) executing the application 100 submits a similarity search request 102 to a server 108 at which the database system 106 resides. The client and server may preferably be connected via a public information network such as, for example, the Internet or World Wide Web (WWW), however, the client and server may alternatively be connected via a private network, a local area network, or some other suitable network.

Figure 2:
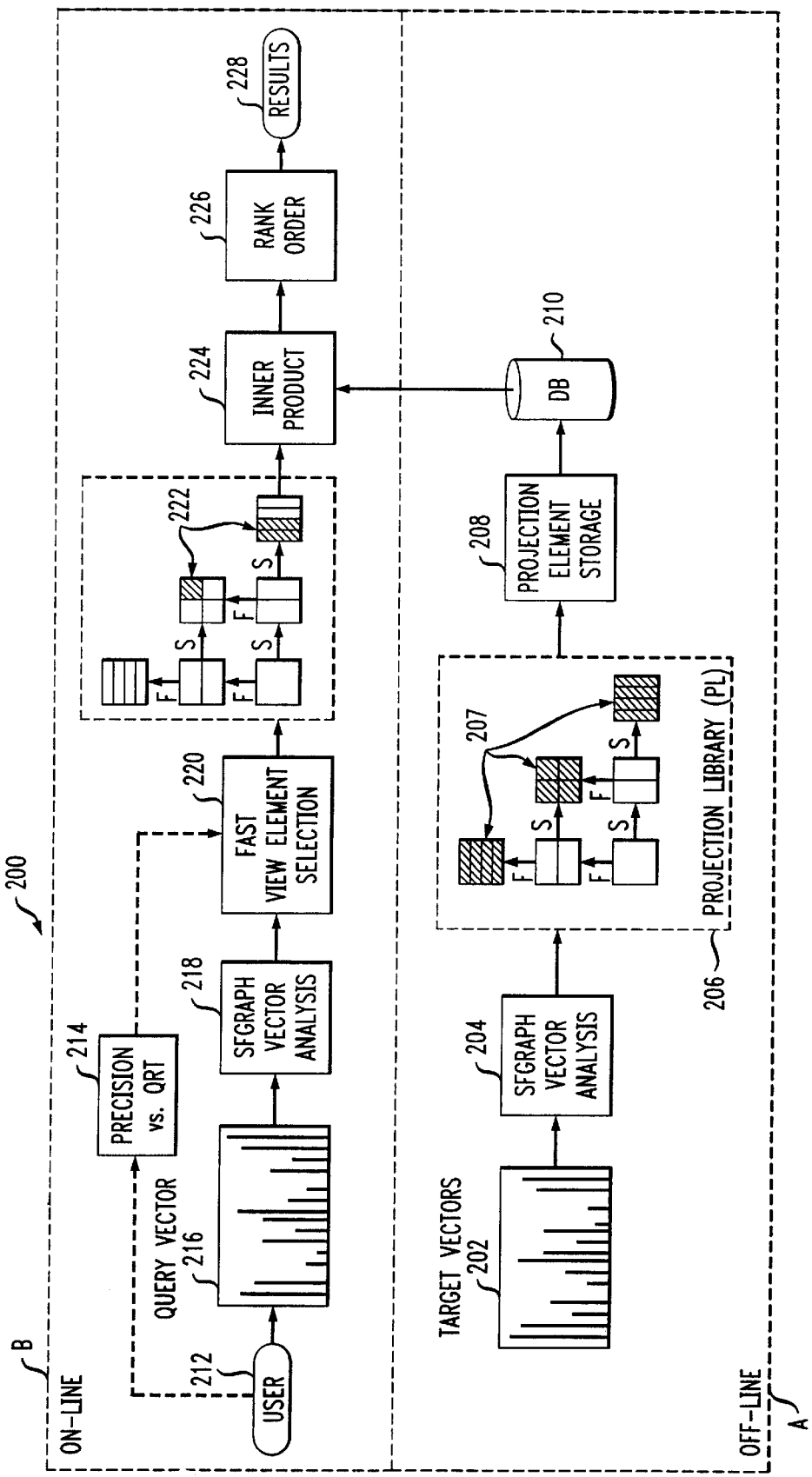
FIG. 2 is a block diagram illustrating a fast query approximation system using a query vector projection access method according to the present invention.

FIG. 2 depicts a fast query approximation system 200 using a query vector projection access method according to the present invention. It is to be appreciated that such a system 200 and associated methodology may be implemented in accordance with the client-server networked information system illustrated in FIG. 1. The method comprises an off-line phase (A) and an on-line phase (B).

In the off-line phase, the system 200 obtains target vectors 202 of images which will comprise the content of the database and performs a spatial and frequency graph vector analysis 204 on the target vectors $v_r$. From this analysis, a projection library 206 of projection elements 207 is constructed. Projection elements are then stored in store 208 for use by the database system 210 in response to a user query. That is, the projection elements are stored in association with the data in the database 210. The projection elements then provide a description of the data in the cases when the target vectors 202 correspond to feature vectors extracted from the data. Thus, the projection elements serve as meta-data or, in other words, provide a meta-data description of the data in the database. For example, the meta-data may correspond to audio, video, image and/or time-series data associated with the database. The meta-data may also correspond to such aspects of the data as color, texture, shape, and/or motion. Further details of these target vector analysis operations will be explained below.

In the on-line phase, a user 212 sets a query precision bound $(1-\epsilon)$ 214 and issues a query vector $(v_q)$ 216. As will be explained, the query precision bound allows the user to tradeoff query-response time and query-precision. The system performs a spatial and frequency graph vector analysis 218 on the query vector 216. Using a fast basis selection algorithm 220, the system selects the transformation of $v_q$ that compacts its energy into a small number of dimensions. Then, using a projection element selection algorithm, the system selects the projection elements 222 for $v_q$ and each $v_t$ that result in a loss of similarity precision less than $\epsilon$. The system computes the similarity of $v_q$ and each $v_t$ from the inner product 224 of the projection elements 222. The system then ranks 226 the target vectors $v_t$ according to the similarity scores and returns the results 228 to the user 212.

One important difference between the methodology of the invention and existing multi-dimensional indexing approaches is that the system analyzes (i.e., vector analysis 218) the query vector 216 and reduces the dimensionality of the query and target vectors 202 on the basis of the analysis. This significantly differs from existing methods that derive the transformation by analyzing the target vectors a priori. The methodology of the invention better characterizes the query since it adapts to the specific characteristics of each query vector.

The construction of the projection library 206 is one important part of the inventive query method. The projection library 206 provides the building blocks for deriving the transformations of the query. The projection library 206 is constructed using a space and frequency graph. The space and frequency graph decomposes the vectors in space via binary spatial segmentation and in frequency via a two-band Haar filter bank. The stored elements of the projection library correspond to the leaf nodes of the space and frequency graph.

In the space and frequency graph, the spatial segmentation (S) and frequency (F) operators are defined as follows, and as also described in the above-referenced U.S. patent application identified by Ser. No. 09/079,662 and entitled "Interactive Representation and Retrieval of Multi-dimensional Data Using View Elements,":

Spatial analysis S: the spatial segmentation operators $S_0$ and $S_1$ partition each vector v into two halves, where $S_0$ and $S_1$ are given by $$S_0^N = \begin{bmatrix} I^{\frac{N}{2}} & 0 \\ 0 & 0 \end{bmatrix}, \text{ and } S_1^N = \begin{bmatrix} 0 & 0 \\ 0 & I^{\frac{N}{2}} \end{bmatrix},$$

where $S_i^N$ has size $$\frac{N}{2} \times \frac{N}{2}$$

and $I^{N/2}$ is the $$\frac{N}{2} \times \frac{N}{2}$$

identity matrix. Following the partitioning of v, this yields:

$$x_0[n] = \begin{cases} v[n] & n < \frac{N}{2} \\ 0 & o.w. \end{cases} \text{ and } x_1[n] = \begin{cases} 0 & n < \frac{N}{2} \\ v[n] & o.w. \end{cases}$$

Frequency analysis F: the frequency operators $H_0$ and $H_1$ rotate v using the Haar transform, where $H_0$ and $H_1$ are given recursively by $$H_i^M = \begin{bmatrix} H_i^{M-1} & 0 \\ 0 & H_i^{M-1} \end{bmatrix},$$

where $i \in \{0,1\}$ and $H_i^{(M)}$ has size $2^{M+1} \times 2^M$. For M=1, $$H_i^{(1)} = \left( \frac{\sqrt{2}}{2}, (-1)^i \frac{\sqrt{2}}{2} \right).$$

Following the rotations of v, where v has $2^M$ dimensions and $y_0 = H_0^{(M)} v$ and $y_1 = H_1^{(M)} v$, this yields:

$$y_0(n) = \frac{\sqrt{2}}{2}(v[2n] + v[2n+1]) \text{ and } y_1[n] = \frac{\sqrt{2}}{2}(v[2n] - v[2n+1]).$$

The space (S) and frequency (F) analyses are each "non-redundant" and "complete" operations since they do not expand the amount of data contained in v, and v can be reconstructed perfectly as follows:

Spatial synthesis S: perfect reconstruction of v from the spatial segments $x_0$ and $x_1$ results from the following property of $S_0$ and $S_1$: $S_0^N + S_1^N = 1^N$. As such, v can be reconstructed by adding the segments $x_0$ and $x_1$ as follows: $v[n] = x_0[n] + x_1[n]$.

Frequency synthesis F: perfect reconstruction of v from the sub-bands $y_0$ and $y_1$, is carried out by a synthesis filter bank, where the synthesis transformations $G_i$ are given by $G_i = H_i^T$. The filter bank satisfies the condition of perfect reconstruction when $G_0 H_0 + G_1 H_1 = I$. For $H_i^{(M-1)}$ based on the Haar filter bank, it can be shown that $G_0^{(M)} G_0^{(M)} + G_1^{(M)} H_1^{(M)} = I^M$, where $I^M$ is the M×M identity matrix. As such, v is obtained by adding the transformed sub-bands $y_0$ and $y_1$ as follows:

$$v[n] = \frac{\sqrt{2}}{2}(y[2n] + y[2n+1]) + \frac{\sqrt{2}}{2}(y[2n] - y[2n+1]).$$

In order to generate the projection elements, the space and frequency analyses is iterated using a space and frequency graph. The commutativity of the space and frequency operations is essential to their integration in the space and frequency graph.

The commutativity is shown as follows: let each element $v_{i,j,k,l}$ correspond to a space and frequency localized projection of the vector v, where i and j give the spatial and frequency resolution of the projection, and k and l give the spatial and frequency location of the projection. The original vector v is placed at the root of the space and frequency graph $v_{0,0,0,0}$. In general, the decomposition of $v_{i,j,k,l}$ is generated as follows:

Spatial analysis S: $S_0$ and $S_1$ generate $v_{i+1,j,2k,l}$ and $v_{i+1,j,2k+1,l}$ as follows:

$v_{i+1,j,2k,l}=S_0 v_{i,j,k,l}$ and $v_{i+1,j,2k+1,l}=S_1 v_{i,j,k,l}$.

Frequency analysis F: $H_0$ and $H_1$ generate $v_{i,j+1,k,2l}$ and $v_{i,j+1,k,2l+1}$ as follows:

$v_{i,j+1,k,2l}=H_0 v_{i,j,k,l}$ and $v_{i,j+1,k,2l}=H_1 v_{i,j,k,l}$.

The commutativity of S and F implies that the order of these operations does not matter. For example, $v_{i+1,j+1,2k,2l}$ is obtained equivalently via two paths S→F and F→S:

$v_{i+1,j+1,2k,2l}=S_0 v_{i,j+1,k,2l}=S_0 H_0 v_{i,j,k,l}$ and $v_{i+1,j+1,2k,2l}=H_0 v_{i+1,j,2k,l}=H_0 S_0 v_{i,j,k,l}$.

In a one-step cascade, this requires that, in general, $S_i H_j = H_j S_i$, for $i,j \in \{0,1\}$. Since $H_j^M$ has a partitionable form, $S_i^M H_j^{(M)} = H_j^{(M)} S_i^M$ for the transformation of a $2^M$-dimensional vector. Furthermore, from the recursive definition, $H_i^M$ is block-diagonal with $2^{M-1}$ partitions. This allows us to have commutativity of S and F in a cascade with as many as M—1 spatial segmentation (S) operations.

The commutativity carries over to the synthesis operations in the space and frequency graph. In general, the reconstruction of a projection element $v_{i,j,k,l}$ in space and frequency is given by $v_{i,j,k,l}=v_{i+1,j,2k,l}+v_{i+1,j,2k+1,l}$ and $v_{i,j,k,l}=G_0 v_{i,j+1,k,2l}+G_1 v_{i,j+1,k,2l+1}$, respectively. The input vector is re-synthesized from its frequency children using $G_0$ and $G_1$, where $G_1=H_i^T$.

Figure 3:
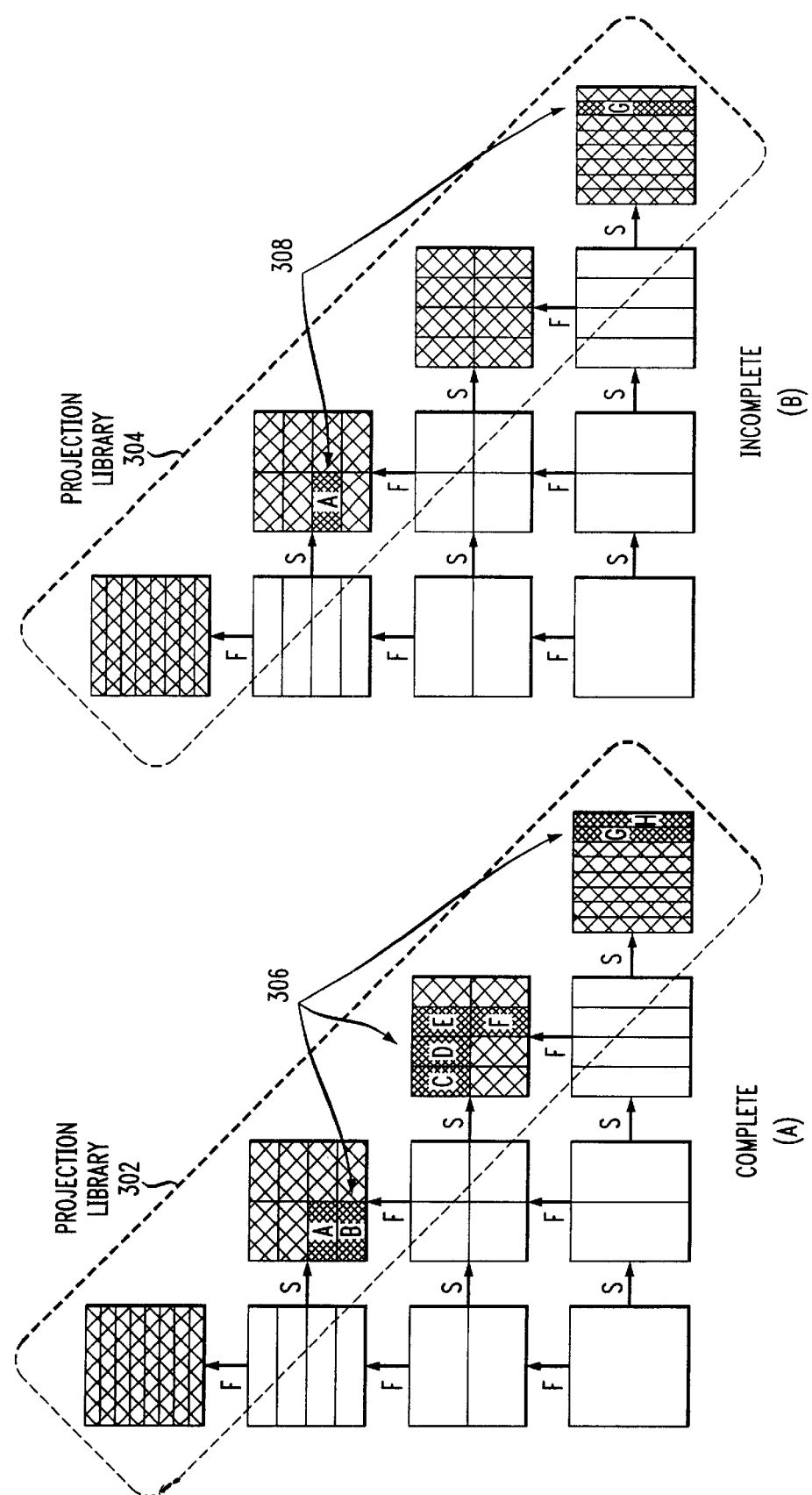
FIGS. 3A and 3B are diagrams illustrating a projection library according to the present invention for storing leaf nodes of a space and frequency graph, with FIG. 3A relating to a complete and non-redundant set of projection elements and FIG. 3B relating to an incomplete and non-redundant set of projection elements.

The system 200 constructs the projection library from the leaf nodes of the space and frequency graph, as illustrated in FIGS. 3A and 3B. Each S and F transition path corresponds to a spatial or frequency decomposition of a projection element $v_{i,j,k,l}$, respectively. A space and frequency graph of depth D has $N_t=(\Sigma_{d=1}^{D} d)$ space and frequency transition paths of each type. Each set of spatial segmentation operations in an S transition path requires O(N) multiplies, and each set of frequency analysis operations in an F transition path requires O(N) additions and multiplies, where N is the dimensionality of the vector v. Overall, to generate a space and frequency graph of depth D, and equivalently, to expand the vector v into the projection library requires $O(2N \Sigma_{d=1}^{D} d)$ multiplies and $O(N \Sigma_{d=1}^{D} d)$ additions.

The perfect reconstruction properties of $S_i$, $H_j$, and $G_j$ allows that any complete set of elements $\{v^*_{i,j,k,l}\}$ reconstructs the vector v. As such, the system can represent a vector v with perfect precision by any complete and non-redundant set of the elements. The projection library provides an extremely large number of ways of selecting the elements to transform the vectors.

This is illustrated as follows: consider a vector v of N dimensions. The system constructs a projection library from a space and frequency graph of depth $D=\log_2 N$. The projection library expands the amount of data in v by $E_p=D$. The process generates $N_p$ terminal projection elements in the projection library, where $N_p=D 2^{D}_1$.

The terminal projection elements $v_{j,k,l}$ correspond to the leaf nodes 302 (shown in light shade in FIG. 3A) and 304 (shown in light shade in FIG. 3B) of the space and frequency graph, where i+j=D. Overall, the projection library provides $B_p(D)$ ways to select the projection elements to form unique, complete, and non-redundant transformations, where $B_p$ is given by the recursive relation: $B_p(D)=2B_p(D-1)^2-B_p(D-2)^2$ and $B_p(0)=0$ and $B_p(1)=1$.

The example illustrated in FIG. 3A depicts an eight-dimensional, complete, and non-redundant set of projection elements 306 (shown in dark shade in FIG. 3A). The number of complete transformations $B_p(D)$ in the projection library grows extremely fast as the number of dimensions increases. For example, for N=256, there are $B_p(8) \approx 10^{33}$ orthonormal transformations to choose from. Of these, the system uses a fast search method to select the one that is optimal for the query. The projection library also provides $B_{pi}(D)$ ways to select the projection elements to form unique, in-complete, and non-redundant projections, where $B_{pi}$ is given by the recursive relation: $B_{pi}(D)=2B_{pi}(D-1)^2-B_{pi}(D-2)^2$ and $B_{pi}(0)=1$ and $B_{pi}(1)=2$.

FIG. 3B depicts a two-dimensional, incomplete, non-redundant set of projection elements 308 (shown in dark shade in FIG. 3B). The number of incomplete projections grows even faster than the number of transformations. For example, for N=256, there are $B_{pi}(8) \approx 10^{67}$ unique sets of projection elements to choose from. In order to approximate the query, the system can select the set that provides the best query approximation performance. Table 1 below summarizes these results for various dimensionalities N of vector v:

TABLE 1

| N | D | $N_t$ | $N_p$ | $E_p$ | $B_p$ | $B_{pi}$ |
|---|---|---|---|---|---|---|
| 4 | 2 | 3 | 4 | 2 | 2 | 7 |
| 8 | 3 | 6 | 12 | 3 | 7 | 82 |
| 16 | 4 | 10 | 32 | 4 | 82 | 11,047 |
| 32 | 5 | 15 | 80 | 5 | 11,047 | $1.9 \times 10^8$ |
| 64 | 6 | 21 | 192 | 16 | $1.9 \times 10^8$ | $6.4 \times 10^{16}$ |
| 128 | 7 | 28 | 448 | 7 | $6.4 \times 10^{16}$ | $6.7 \times 10^{33}$ |
| 256 | 8 | 36 | 1,024 | 8 | $6.7 \times 10^{33}$ | $7.2 \times 10^{67}$ |
| 512 | 9 | 45 | 2,304 | 9 | $7.2 \times 10^{67}$ | $8.4 \times 10^{135}$ |
| 1,024 | 10 | 55 | 5,120 | 10 | $8.4 \times 10^{135}$ | |

That is, Table 1 illustrates projection library size and complexity for an N-dimensional vector: depth of space and frequency decomposition (D), number of transition elements in the space and frequency graph ($N_t$), number of projections elements ($N_p$), amount of data expansion ($E_p$), and number of unique complete transformations ($B_p$) and incomplete projections ($B_{pi}$).

The system measures the similarity of feature vectors to discriminate between items in the database. The query $v_q$ and target vectors $v_t$ are points in an N-dimensional space, $v_q$, $v_t \in R^N$. Vector similarity is derived from proximity in multi-dimensional space using a distance metric D(q,t). Many applications, such as content-based retrieval of color photographs normalize the color histogram vectors to one, as follows: $\Sigma_m v_q[m]^2 = \Sigma_m v_t[m]^2 = 1$. Using a Euclidean distance metric D, vector proximity is given by $D(q,t)=\sqrt{(v_q-v_t)^T(v_q-v_t)}$. If the vectors $v_q$ and $v_t$ are normalized to one, then $D(q,t)=\sqrt{2-2v_q^T v_t}$ gives the similarity S(q,t) of $v_q$ and $v_t$ from $$S(q,t) = \frac{2 - D(q,t)^2}{2}.$$

This gives that the inner product of the query vector $v_q$ and the target vector $v_t$ determines their similarity: $S(q,t)=v_q^T v_t$. The similarity $S(q,t) \in \{0,1\}$ and S(q,t)=1 is maximum when $v_t=v_q$. The system uses S(q,t) in the query process to rank the target vectors and return the best K matches.

The vector similarity is approximated using projected vectors. Any non-redundant and complete set of elements forms an orthonormal transformation T. In addition, any non-redundant and incomplete set of elements forms a projection, or transformation that is not of full rank. For each transformation T, there corresponds a set of space and frequency operations that generate the selected elements. For example, consider the two projection elements shown in FIG. 3B, where $A=v_{3,0,7,0}$ and $G=v_{1,2,0,0}$. $S_1S_1S_0v$ gives $V_{3,0,7,0}$ and $S_1H_0H_0v$ gives $v_{1,2,0,0}$. Together, these form the transformation $T=[S_1S_1S_0S_1H_0H_0]^T$.

Given the transformation T defined by the projection elements, the system transforms the query and target vectors by $Tv_q$ and $Tv_t$. Then, the system computes the projected similarity $S_p(q,t)$ from $S_p(q,t)=(Tv_q)^T(Tv_t)$.

With a complete transformation T, the system computes the query with perfect precision, $S_p(q,t)=S(q,t)$. This follows from $S_p(q,t)=V_q^T T^T Tv_t$ and $T^T T=I$, which gives $S_p(q,t)=v_q^T v_t$. With an incomplete transformation T, the system approximates the query, $S_p(q,t)\approx S(q,t)$. The similarity metric measures the approximation of a transformed vector $v_a=T_v$ to the original vector v. Since $\tilde{v}=T^T v_a=T^T Tv$ reconstructs v, $S=(T_T Tv)^T v$ measures their similarity. As a result, $S=vT^T Tv=v_a^T v_a$ measures the energy of the transformed vector $v_a$. Therefore, the energy of $v_a$, $v_a^T v_a$, measures the approximation of the projection $v_a$ to the N-dimensional vector v. For $v_a^T v_a=1$, the system perfectly reconstructs v. For $1-\epsilon=v_a^T v_a<1$, $v_a$ approximates v with an error of $\epsilon$.

The query system first searches the projection library to find the best transformation of the query vector. Then, the system computes the query using the high-energy projection elements of the selected transformation. The access method of the present invention first finds a complete transformation of the query vector that has good energy compaction properties. The algorithm requires a two-way decision for each intermediate node in the space and frequency graph. Overall, it requires $O(N/2 \log_2 N)$ decisions.

A fast adaptive transformation algorithm, according to the invention, employed by the selection module 220 of FIG. 2 will first be explained in detail, followed by a detailed explanation of a fast adaptive query computation algorithm, according to the invention, employed in accordance with blocks 224 and 226 of FIG. 2.

(A) Algorithm 1: Fast Adaptive Transformation

Figure 6:
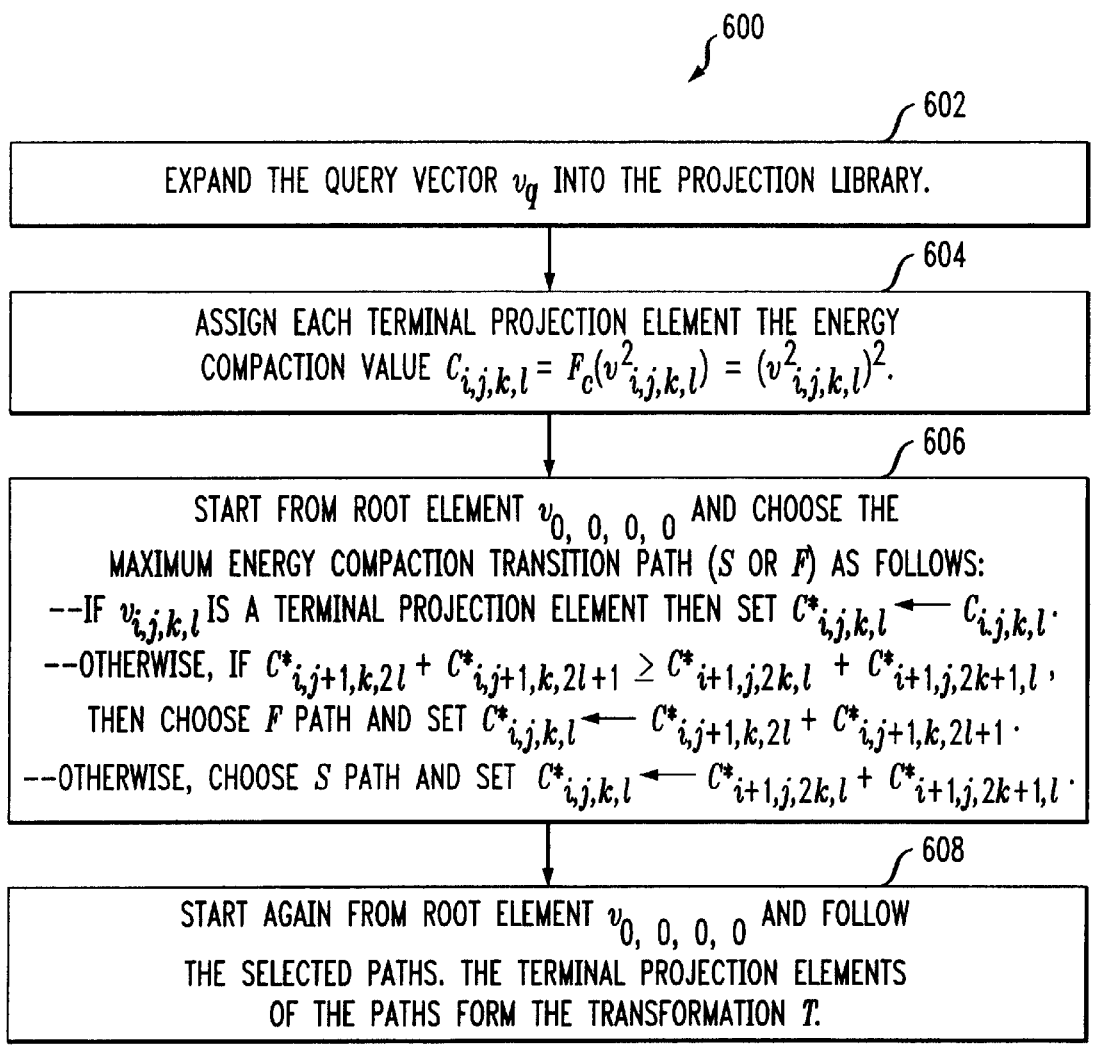
FIG. 6 is a flow diagram illustrating a fast adaptive transformation algorithm according to one embodiment of the present invention.

The system selects the transformation from the projection library that best compacts the query vector as illustrated in the methodology 600 of FIG. 6 and as follows:

Expand the query vector $v_q$ into the projection library (step 602).

Assign each terminal projection element the energy compaction value $C_{i,j,k,l}=F_c(v^2_{i,j,k,l})=(v^2_{i,j,k,l})^2$ (step 604).

Start from root element $v_{0,0,0,0}$ and choose the maximum energy compaction transition path (S or F) as follows (step 606):

If $v_{i,j,k,l}$ is a terminal projection element then set $C^*_{i,j,k,l} \leftarrow C_{i,j,k,l}$.

Otherwise, if $C^*_{i,j+1,k,2l}+C^*_{i,j+1,k,2l+1} \geq C^*_{i+1,j,2k,l}+C^*_{i+1,j,2k+1,l}$, then chosse F path and set $C^*_{i,j,k,l} \leftarrow C^*_{i,j+1,k,2l}+C^*_{i,j+1,k,2l+1}$.

Otherwise, choose S path and set $C^*_{i,j,k,l} \leftarrow C^*_{i+1,j,2k,l}+C^*_{i+1,j,2k+1,l}$.

Start again from root element $v_{0,0,0,0}$ and follow the selected paths. The terminal projection elements of the paths form the transformation T (step 608).

The fast adaptive transformation algorithm rapidly searches the projection library and selects the set of projection elements that maximizes the energy compaction function. Since the selected transformation has good energy compaction, the system next uses its projection elements in sorted order of maximum energy to compute the query.

(B) Algorithm 2: Fast Adaptive Query Computation

The query computation procedure guarantees that the system computes the query within a given precision bound $1-\epsilon$ (recall that the precision bound is preferably provided by the user). This requires the analysis of the transformed query and target vector energies in each stage of the query. The algorithm computes the residual energy in the query and target vectors and makes the worst case assumption that the residual energy is retained in the same projection elements for the query and target vectors. This alignment maximizes the residual energy intersection and provides a bound for the error in the query computation.

Figure 7:
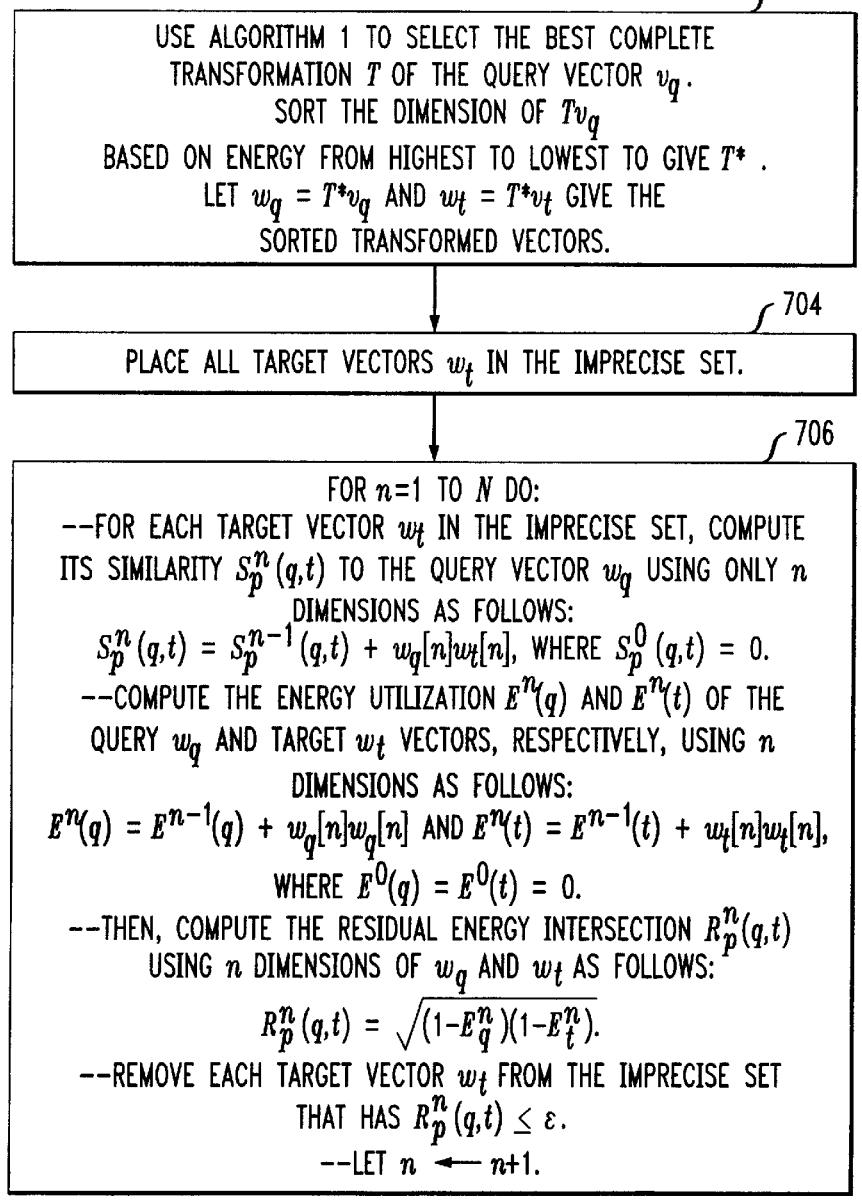
FIG. 7 is a flow diagram illustrating a fast adaptive query computation algorithm according to one embodiment of the present invention.

The system performs the query within a precision bound of $1-\epsilon$ as illustrated in the methodology 700 of FIG. 7 and as follows:

Use Algorithm 1 to select the best complete transformation T of the query vector $v_q$. Sort the dimensions of $Tv_q$ based on energy from highest to lowest to give T*. Let $w_q=T^* v_q$ and $w_t=T^* v_t$ give the sorted transformed vectors (step 702).

Place all target vectors $w_t$ in the imprecise set (step 704).

For n=1 to N do (step 706):

For each target vector $w_t$ in the imprecise set, compute its similarity $S_p^n(q, t)$ to the query vector $w_q$ using only n dimensions as follows:

$S_p^n(q, t)=S_p^{n-1}(q, t)+w_q[n]w_t[n]$, where $S_p^0(q, t)=0$.

Compute the energy utilization $E^n(q)$ and $E^n(t)$ of the query $w_q$ and target $w_t$ vectors, respectively, using n dimensions as follows:

$E^n(q)=E^{n-1}(q)+w_q[n]w_q[n]$ and $E^n(t)=E^{n-1}(t)+w_t[n]w_t[n]$, where $E^0(q)=E^0(t)=0$.

Then, compute the residual energy intersection $R_p^n(q, t)$ using n dimensions of $w_q$ and $w_t$ as follows:

$R_p^n(q,t)=\sqrt{(1-E_{q^n})(1-E_{t^n})}$.

Remove each target vector $w_t$ from the imprecise set that has $R_p^n(q,t) \leq \epsilon$.

Let $n \leftarrow n+1$.

Algorithm 2 tracks the precision of the similarity computation of the query vector $v_q$ with each target vector $v_t$. The system uses a greater number of dimensions for those target vectors $v_t$ for which the residual energy intersection $R_p^n(q,t)$ is not within the error bound $\epsilon$. The system uses fewer dimensions for those target vectors $v_t$ for which $R_p^n(q, t)<\epsilon$. The system adds projection elements until it computes each query within the error bound $R_p^n(q, t) \leq \epsilon$.

Figure 4:
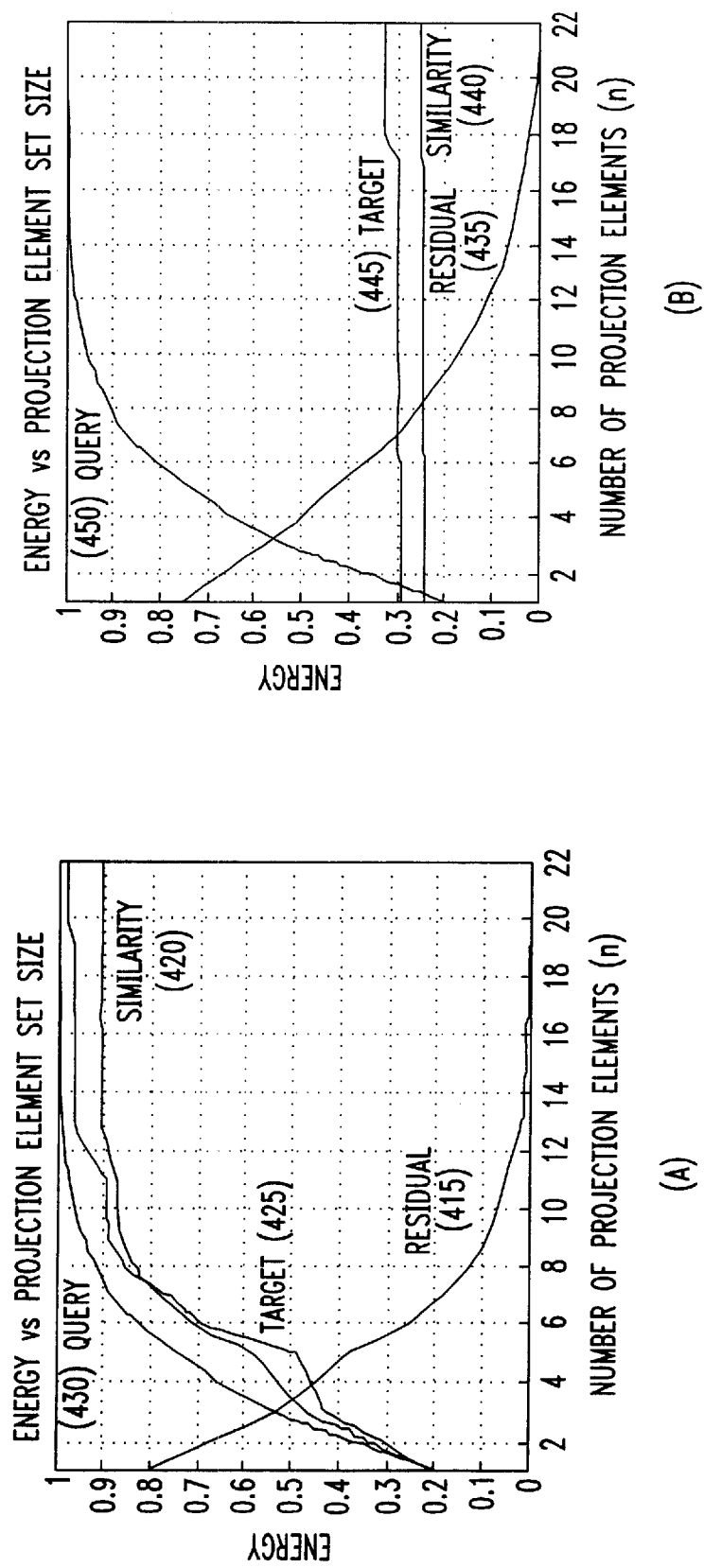
FIGS. 4A and 4B are diagrams illustrating results of a query process using a 512 dimensional query vector in accordance with the present invention.

FIGS. 4A and 4B illustrates the query computation process for querying of 512 dimensional color histograms. The query computations are shown for query vector $v_q$ (430, 450) with a similar target vector $v_{t1}$ (425) (FIG. 4A) and a dissimilar target vector $v_{t2}$ (445) (FIG. 4B). Specifically, the plots respectively show reduction of the residual energy intersection $R_p^n(q, t)$ with increasing n for (a) the similar target vector $v_{t1}$; and (b) the dissimilar target vector $v_{t2}$, where "query"=$E^n(q)$, "target"=$E^n(t)$, "similarity"=$S_p^n(q, t)$, and "residual"=$R_p^n(q, t)$. In both cases, as more projection elements are used (n increases), the error $R_p^n(q, t)$ (415, 435) drops. In both cases, the error reaches zero after using n=22 projection elements out of a maximum of 512.

In FIG. 4A, $R_p^n(q, t)$ serves as a good approximation of the actual error in the similarity score $S_p^n(q, t)$ (420) since $v_q$ and $v_{t1}$ are similar. For $v_{t1}$, the system needs to use only n=8 projection elements in order to reach a precision of $1-\epsilon=0.9$. In FIG. 4B, $R_p^n(q, t)$ bounds but does not closely approximate actual error in $S_p^n(q, t)$ (440). The error bound $R_p^n(q, t) \rightarrow 0$ (435) as the system uses more projection elements, although the actual similarity score (440) changes only slightly, $\forall n>1$, $S_p^0(q, t) \approx S_p^n(q, t)$. For $v_{t2}$, the system needs to use n=13 projection elements in order to reach a precision of $1-\epsilon=0.9$.

The access method according to the invention is evaluated using content-based image query experiments on a database of 512 dimensional color histograms generated from a collection of 11,000 color photographs. The histograms were generated by transforming the color photographs to HSV (hue saturation value) color space and quantizing to 512 colors. The histograms were normalized to one. Four image retrieval experiments were conducted of content-based queries for images of beaches (14), horses (26), nature (46) and sunsets (46). Each of these 132 images was used in turn to query the database. Different sized sets of projection elements were used and the average retrieval effectiveness was computed over the queries. FIGS. 5A through 5D show the retrieval effectiveness results of each of the four experiments, respectively.

Figure 5:
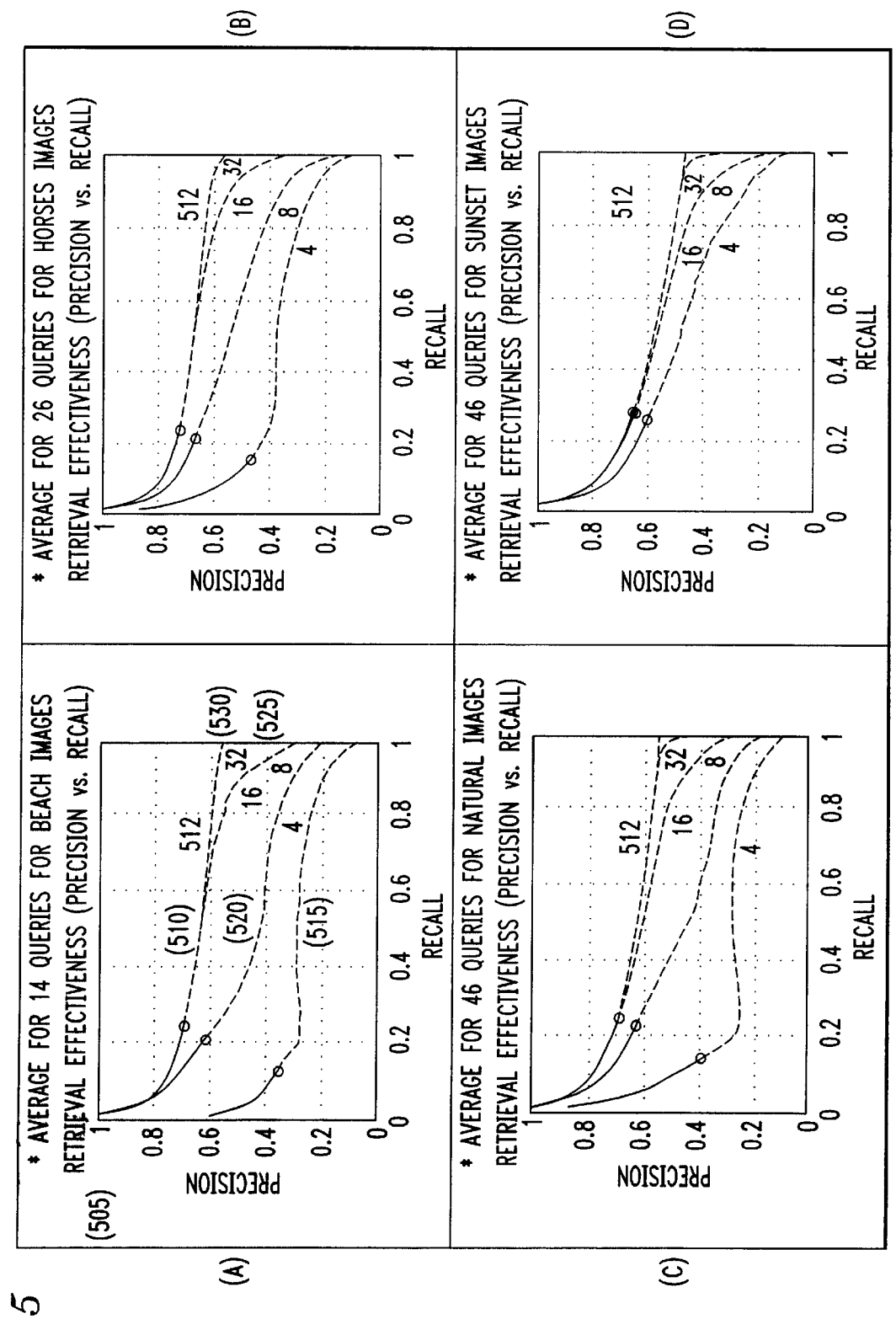
FIGS. 5A through 5D are respective diagrams illustrating average retrieval effectiveness for four content-based image queries in accordance with the present invention.

For the beach image queries (505), the average retrieval effectiveness of the 14 beach image queries was measured in terms of precision and recall using a subjective binary measure of relevance of each image in the database to each query. As shown in FIG. 5A, using all 512 dimensions of the query histograms gives the best performance (510). However, using 32 projection elements causes little drop in the retrieval effectiveness (530). Using 16 projection elements lowers the precision for high recall values (525). Using 8 projection elements drops the precision by only 0.1 in the top twenty matches (520). Using only 4 projection elements drops the precision by 0.35 in the top twenty matches (515).

FIGS. 5B, 5C and 5D show the results for queries of horses, nature and sunsets, respectively. FIG. 5B shows the average retrieval effectiveness for the queries of horse images. Using 8 projection elements allows the horse queries to be computed with only a slight loss in precision. FIG. 5C shows the results for the 46 queries of nature images. Using 4 projection elements for the nature images causes a drop in precision by a significant amount but 8 projection elements suffices well. FIG. 5D shows the results for 46 queries of sunsets. Using 4 projection elements drops the sunsets query precision by only 0.05 in the top twenty matches.

Figure 8:
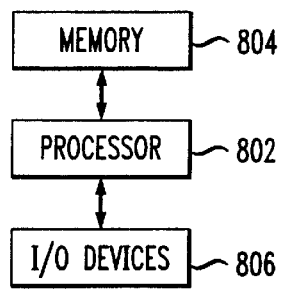
FIG. 8 is a block diagram illustrating a hardware implementation of a fast query approximation system according to one embodiment of the present invention.

Referring now to FIG. 8, a block diagram is shown of an exemplary hardware implementation of the system 200 of FIG. 2. As shown, the system 200 may be implemented in accordance with a processor 802, a memory 804 and I/O devices 806. It is to be appreciated that the term "processor" as used herein is intended to include any processing device, such as, for example, one that includes a CPU (central processing unit). The processor may be a digital signal processor, as is well known in the art. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

It is to be appreciated that in a client-server networked information embodiment (FIG. 1), all or portions of the system may be implemented on a server-based computer system having a configuration as shown in FIG. 8, while entry of a user query and generation of a query vector may be implemented on a client-based computer system also having a configuration as shown in FIG. 8. In such case, the user may view results of the query computation at the client computer upon receipt from the server.

Accordingly, methods and apparatus are provided in accordance with the invention for querying by similarity in large collections of high-dimensional vectors by adaptively projecting each query vector into a library of projection elements; by selecting the set of elements that minimizes the work for processing each query; and by adaptively selecting the set of elements in order to exercise the trade off between query precision and query response time. The present invention provides for the storage of the projected vector as a meta-data description of data to enable content-based querying of the data.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for use in association with a database of processing a user query based on similarity of a query vector associated with the user query to one or more multy-dimensionanl target vectors associated with the database, the method comprising the step of:

projecting the query vector into a set of projections elements; and projecting the query vector into a set of projection elements; and adaptively selecting one or more projection elements of the set of projection elements, wherein the selected projection elements represent a transformation of the query vector and have a dimensionality which is not greater than a dimensionality associated with the query vector and wherein the selection need not be based on target vector training, further wherein the selected projection elements may be used for computing similarity between the query vector and the one or more multi-dimensional target vectors associated with the database.

2. The method of claim 1, wherein the adaptive selecting step comprises selecting the one or more projection elements in accordance with a query precision value.

3. The method of claim 2, wherein the query precision value is specified by the user.

4. The method of claim 2, wherein the adaptive selecting step comprises selecting a predetermined number of projection elements to compute the query with a predetermined degree of precision.

5. The method of claim 4, wherein the predetermined number of projection elements is substantially equivalent to a complete set of projection elements associated with the query vector, when computing the query with a substantially high degree of precision.

6. The method of claim 5, wherein the predetermined number of projection elements is equivalent to an incomplete set of projection elements associated with the query vector, when computing the query with a relatively lower degree of precision.

7. The method of claim 2, wherein a query computation response time is a function of the query precision value.

8. The method of claim 1, wherein similarity between the query vector and the one or more multi-dimensional target vectors associated with the database is computed by calculating a distance metric between one or more projection elements associated with the query vector and one or more projection elements associated with a target vector.

9. The method of claim 1, wherein the set of projection elements comprises one or more space and frequency dimensions associated with a vector.

10. The method of claim 1, wherein the adaptive selecting step comprises selecting projection elements from the set to substantially maximize an energy compaction function.

11. The method of claim 10, wherein the similarity computation is based on residual energy associated with the query vector and the target vectors.

12. The method of claim 1, further comprising the step of ranking results associated with the similarity computation performed between the query vector and the one or more multi-dimensional vectors associated with the database.

13. The method of claim 1, further comprising the step of storing a projection element as a meta-data description.

14. The method of claim 13, wherein the meta-data corresponds to at least one of audio, video, image and time-series data.

15. The method of claim 13, wherein the meta-data corresponds to at least one of color, texture, shape, and motion.

16. Apparatus for use in association with a database for processing a user query based on similarity of a query vector associated with the user query to one or more multi-dimensional target vectors associated with the database, the apparatus comprising:

at least one processor operative to: (i) project the query vector into a set of projection elements; and (ii) adaptively select one or more projection elements of the set of projection elements, wherein the selected projection elements represent a transformation of the query vector and have a dimensionality which is not greater than a dimensionality associated with the query vector and wherein the selection need not be based on target vector training, further wherein the selected projection elements may be used for computing similarity between the query vector and the one or more multi-dimensional target vectors associated with the database; and a memory, coupled to the processor, for storing at least one of the set of projection elements and the target vectors.

17. The apparatus of claim 16, wherein the processor and the memory is associated with a server in a networked information system.

18. The apparatus of claim 17, wherein the query is provided by the user at a client device coupled to the networked information system.

19. The apparatus of claim 18, wherein results of the similarity computation are provided to the user at the client device.

20. An article of manufacture for use in association with a database for processing a user query based on similarity of a query vector associated with the user query to one or more multi-dimensional target vectors associated with the database, comprising a machine readable medium containing one or more programs which when executed implement the steps of:

projecting the query vector into a set of projection elements; and adaptively selecting one or more projection elements of the set of projection elements, wherein the selected projection elements represent a transformation of the query vector and have a dimensionality which is not greater than a dimensionality associated with the query vector and wherein the selection need not be based on target vector training, further wherein the selected projection elements may be used for computing similarity between the query vector and the one or more multi-dimensional target vectors associated with the database.

\* \* \* \* \*

UNITED STATES PATENT AND TRADEMARK OFFICE
CERTIFICATE OF CORRECTION

PATENT NO.    : 6,694,311 B1
DATED         : February 17, 2004
INVENTOR(S)   : John R. Smith It is certified that error appears in the above-identified patent and that said Letters Patent is hereby corrected as shown below:

Column 1,
Line 48, delete ";".

Column 2,
Line 33, "subscript 16" should be -- superscript 16 --.
Line 34, "subscript 33" should be -- superscript 33 --.

Column 5,
Line 17, "auser" should be -- a user --.

Column 7,
Line 12, "2l" should be -- 2l+1 --.
Line 58, "$v_j$" should be -- $v_i$ --.

Column 12,
Line 29, "multy-" should be -- multi- --.
Line 30, "step" should be -- steps --.
Lines 32-33, delete entire paragraph.

Signed and Sealed this

Twenty-fifth Day of May, 2004

JON W. DUDAS
*Acting Director of the United States Patent and Trademark Office*